(12) United States Patent
Pellen et al.

(10) Patent No.: US 11,514,669 B2
(45) Date of Patent: Nov. 29, 2022

(54) SEARCH ASSISTANT AND ASSISTANCE METHOD FOR SEARCHING FOR AN ELEMENT IN AN AREA

(71) Applicant: Orange, Paris (FR)

(72) Inventors: Nicolas Pellen, Chatillon (FR); Régis Esnault, Chatillon (FR); Christian Gregoire, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/127,614

(22) Filed: Dec. 18, 2020

(65) Prior Publication Data
US 2021/0192208 A1    Jun. 24, 2021

(30) Foreign Application Priority Data
Dec. 20, 2019 (FR) ...................................... 1915087

(51) Int. Cl.
  *H04N 7/18* (2006.01)
  *G06V 20/00* (2022.01)
  *G10L 15/22* (2006.01)

(52) U.S. Cl.
  CPC .............. *G06V 20/00* (2022.01); *G10L 15/22* (2013.01); *H04N 7/18* (2013.01); *G10L 2015/223* (2013.01)

(58) Field of Classification Search
  CPC .............. G06K 9/2027; G06K 9/00671; G06K 9/00624; H04N 7/18; G10L 15/22; G10L 2015/223

USPC ........ 348/143, 144, 146, 152, 153; 386/226, 386/230
See application file for complete search history.

(56) References Cited

U.S. PATENT DOCUMENTS 8,446,288 B2    5/2013    Mizushima et al.

FOREIGN PATENT DOCUMENTS

| EP | 3 451 135 A1 | 3/2019 |
| FR | 2752347 A1 * | 2/1998 |
| KR | 20180098409 A * | 9/1998 |

OTHER PUBLICATIONS

French Search Report and Written Opinion dated Sep. 2, 2020 for Application No. 1915087.

* cited by examiner

*Primary Examiner* — Robert Chevalier
(74) *Attorney, Agent, or Firm* — Knobbe, Martens, Olson & Bear, LLP

(57) ABSTRACT

Methods and systems are described which relate to the assistance or guidance of a user in the detection of an element in an area. A search assistant for searching for an element in an area may include a direction changer for changing the direction of emission of a visible signal on the basis of detected relative data of an element sought in the area, the relative data detected by at least one sensor such as an audio sensor or a video sensor. Such a search assistant may use a simple visible signal for guidance toward the element sought in the area. The technology used may be easy to implement, cheap and readily accessible, allowing guidance precision that depends solely on the precision of the known or detected location of the sought object.

18 Claims, 4 Drawing Sheets

Fig. 4a
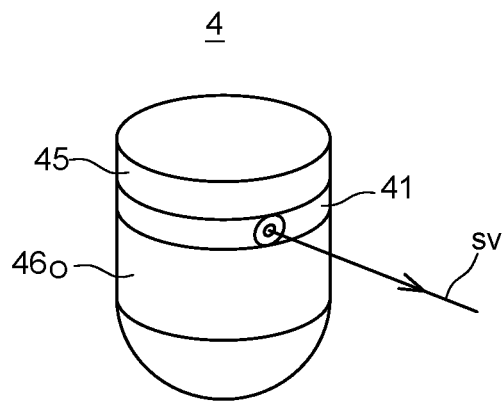
Fig. 4b
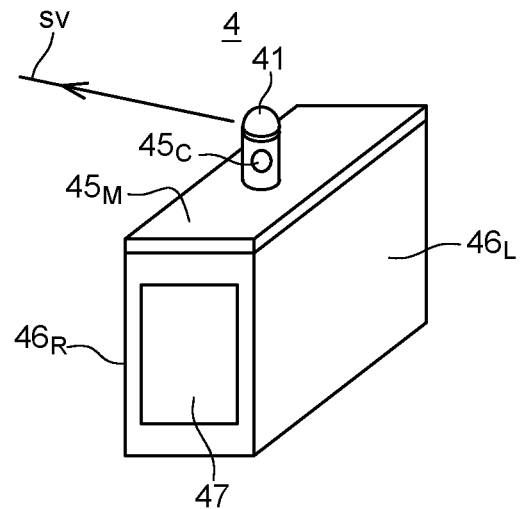
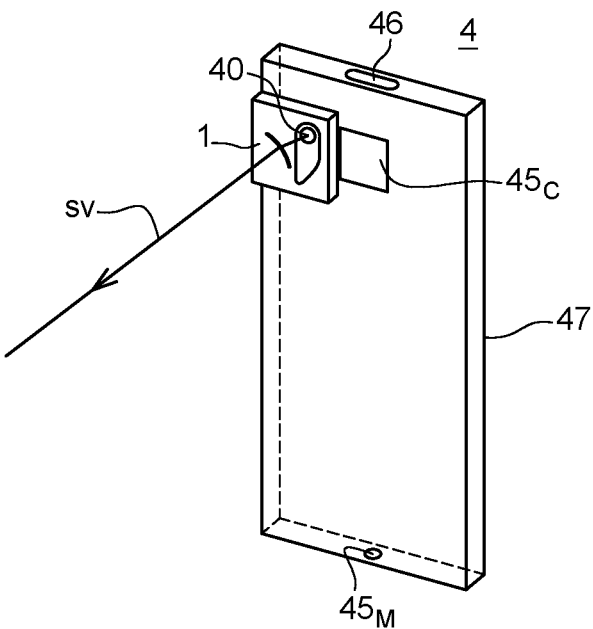
Fig. 4c

SEARCH ASSISTANT AND ASSISTANCE METHOD FOR SEARCHING FOR AN ELEMENT IN AN AREA

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority under 35 U.S.C. § 119(a) to French Patent Application No. 1915087, filed Dec. 20, 2019, the disclosure of which is hereby incorporated by reference in its entirety.

BACKGROUND

Technical Field

The disclosed technology relates to the assistance or guidance of a user in the detection of an element in an area.

Description of the Related Technology

Whether at home or in a business or industrial context, when a person is searching for an element: an object, a transmission source, a particular location, etc., it is difficult for this person to find this element even if they are aware of the place in which the element is located.

This difficulty may be connected to the fact that the element is hidden by something else, for example a key in a handbag or slipped under an envelope on a hallway console. In this case, the person searching for the key does not see it.

Another reason for this difficulty may be that the person has location coordinates for the location of the element, but no reference or measuring tools. The person may know that the element is 2.5 m away, but does not have a measuring tool at hand.

The difficulty may also be due to the fact that the object detector does not provide information on the position of the sought object but only information relating to the environment of the sought object. For example, Japanese patent application JP201803223 proposes an assistance robot that searches for a lost object and notifies the person that the object has been detected by means of a photograph of the sought object in its environment.

The difficulty may also be due to the imprecision of the detection of the object. In particular, when the object is detected using a signal that is either transmitted by the object or reflected by the object, the person may have a device for detecting the object that is capable of receiving this signal, but the location of the source is sometimes expansive since the angle of transmission is wider the further the detector is from the object.

Moreover, the existing locating systems are not always sufficiently precise: meter-level precision whereas the person is searching for an element that is barely a few centimeters in size; coordinates in a two-dimensional space whereas the sought element may equally well have fallen onto the floor, be placed on a table or be hung on a wall (the person may search only on a piece of furniture located at the position indicated by the locating system, whereas the sought element has fallen onto the floor behind this piece of furniture). These locating systems furthermore require the person to move with the locating system in order to determine where the sought element is located. However, this is not always possible depending on how cluttered the search area is, the type of search area (for safety reasons), etc.

In order to alleviate some difficulties, robot guides search for the lost object and take the person to the found object, as proposed by US patent application US20080215184. Although these robots alleviate some difficulties, they are complex and costly tools for simply finding the house keys. Moreover, they are not suitable:

for detecting objects at different heights,
for very cluttered areas,
or for areas in which movements are restricted for safety reasons.

SUMMARY

The disclosed technology aims to rectify certain drawbacks of other solutions.

Embodiments of the disclosed technology relate to a search assistant for searching for an element in an area, the search assistant including a direction changer for changing the direction of emission of a visible signal on the basis of detected relative data of an element sought in the area by means of at least one sensor from among an audio sensor and a video sensor.

Thus, the search assistant uses a simple visible signal for guidance toward the element sought in the area. The technology used is therefore technology that is easy to implement, cheap and readily accessible, allowing guidance precision that depends solely on the precision of the known or detected location of the sought object.

Moreover, the search assistant may thus provide guidance toward any sought element, in particular sought elements that are not provided with an RFID tag or another radio signal transmitter: BLUETOOTH™ transmitter, Wi-Fi™ transmitter, radio transmitter, etc.

Advantageously, the search assistant includes an emitter for emitting the visible signal from among the following emitters:

a rotatable emitter for emitting the visible signal, which implements the direction changer, separate from the emission direction changer, a stationary emitter for emitting the visible signal.

Thus, the search assistant is a comprehensive tool which manages the operation of pointing at the sought element by means of the visible signal from start to finish, which optionally allows the visible signal to be modified. Hence, besides identifying the sought element by remote pointing, the search assistant may incorporate into the visible signal one or more items of information relating to the detection (type of sought element, visibility of the sought element, precision of the detection, etc.) by modifying one of more parameters of the visible signal, such as a luminous power, a modulation of the brightness of the signal, a sweep over a targeted part of the area, etc.

Advantageously, the direction changer is one or more of the following devices:

a rotatable support, which is capable of accommodating a stationary emitter for emitting the visible signal, the movable support being capable of changing the position of the stationary emitter, an optical device, which is capable of changing the direction of the visible signal depending on the element sought in the area.

Advantageously, the rotational mobility is one of the following rotational mobilities:
rotational mobility relative to one or more given axes;
rotational mobility relative to a point.

Advantageously, at least one parameter of the emitted visible signal is dependent on at least one parameter relating to the sought element.

Advantageously, the search assistant includes a controller for controlling the rotation of the movable emitter depending on an element sought in the area.

Advantageously, the search assistant includes a detector for detecting an element sought in the area, the detector for detecting a sought element being capable of commanding a rotation of the movable emitter depending on the detected sought element.

Advantageously, the visible signal is a virtual visible signal displayed by an augmented reality headset, and the sought element is a real element of a real area.

Embodiments of the disclosed technology relate to a voice assistant capable of providing a response to a voice command, the voice assistant further including a direction changer for changing the direction of emission of a visible signal on the basis of detected relative data of an element sought in an area by means of at least one sensor from among an audio sensor and a video sensor.

Embodiments of the disclosed technology relate to a monitoring system for monitoring an area, which is capable of detecting at least one element in the area, the monitoring system further including a direction changer for changing the direction of emission of a visible signal on the basis of detected relative data of an element sought in an area by means of at least one sensor from among an audio sensor and a video sensor.

Embodiments of the disclosed technology relate to a search assistance method for searching for an element in an area with a visible signal, the search assistance method including a change of the direction of emission of a visible signal on the basis of detected relative data of an element sought in an area by means of at least one sensor from among an audio sensor and a video sensor.

Advantageously, the search assistance method further includes a detection of the sought element, which provides at least one parameter relating to a position of the sought element.

Advantageously, the search assistance method includes a detection of the sought element, the detection being of a mode determined on the basis of the type of sought element and providing at least one parameter relating to a position of the sought element.

Advantageously, the search assistance method includes a detection of the sought element, which commands the change of direction of the emitted visible signal.

Advantageously, according to certain embodiments of the disclosed technology, the various steps of the method according to the disclosed technology are implemented by software or a computer program, this software comprising software instructions intended to be executed by a data processor of a device forming part of a search assistant and being designed to command the execution of the various steps of this method.

Embodiments of the disclosed technology therefore also relates to a program comprising program code instructions for executing the steps of the search assistance method for searching for an element according to the disclosed technology when said program is executed by a processor.

This program may use any programming language, and be in the form of source code, object code, or intermediate code between source code and object code, such as in a partially compiled form, or in any other desirable form.

BRIEF DESCRIPTION OF THE DRAWINGS

Certain features and advantages of the disclosed technology will become more clearly apparent upon reading the description, given by way of example, and the related figures.

FIG. 4a shows a simplified diagram of a first embodiment of a system implementing a search assistant.

FIG. 4b shows a simplified diagram of a second embodiment of a system implementing a search assistant.

FIG. 4c shows a simplified diagram of a third embodiment of a system implementing a search assistant.

DETAILED DESCRIPTION

Figure 1:
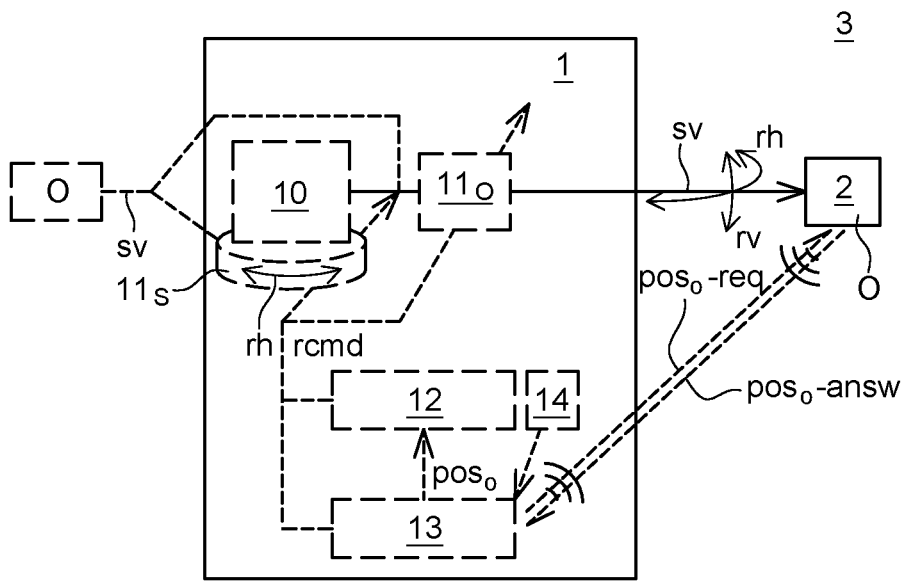
FIG. 1 shows a simplified block diagram of an embodiment of a search assistant.

FIG. 1 illustrates a simplified block diagram of a search assistant.

The search assistant 1 is capable of searching for and finding an element 2 in an area 3. The search assistant 1 includes a direction changer 11S, 11O for changing the direction of emission of a visible signal sv on the basis of detected relative data of an element 2 sought in the area 3 by means of at least one sensor from among an audio sensor and a video sensor.

In particular, the search assistant 1 includes an emitter 10 for emitting the visible signal sv from among the following emitters:

a rotatable emitter for emitting the visible signal, which implements the direction changer, separate from the emission direction changer 11S, 11O, a stationary emitter for emitting the visible signal.

Alternatively, the source 0 of the visible signal is not implemented in the search assistant 1. The direction changer 11S, 11O may optionally be positioned in the path of the visible signal sv in order to change the direction thereof, in particular if the direction changer is an optical device 11O capable of changing the direction of the visible signal sv. Otherwise, the direction changer 11S, 11O may optionally be physically connected to the source 0 in order to change the direction of the emitted visible signal, in particular if the direction changer is a rotatable support 11S capable of accommodating a source 0 of the visible signal.

In particular, the direction changer is one or more of the following devices:

a rotatable support 11S, which is capable of accommodating a stationary emitter 10 for emitting the visible signal, the movable support 11S being capable of changing the position of the stationary emitter 10, an optical device 11O, which is capable of changing the direction of the visible signal sv depending on the element 2 sought in the area 3.

For example, the movable support is composed of a base that is suitable for being placed on a horizontal surface (floor, table, piece of furniture, etc.) or affixed to a vertical surface (wall, vertical side of a piece of furniture, etc.) or under a horizontal surface (ceiling, beam of a structure, etc.)

In particular, the rotational mobility rh, rv is one of the following rotational mobilities:

rotational mobility relative to one or more given axes;
rotational mobility relative to a point.

Thus, the search assistant 1 is capable of emitting a visible signal sv, the direction of which is rotatable horizontally rh and vertically rv.

In particular, at least one parameter of the emitted visible signal sv is dependent on at least one parameter relating to the sought element 2.

For example, one of the parameters of the visible signal may indicate that the sought element is underneath another element that the visible signal is pointing at, in particular by the visible signal oscillating between two colors or by the visible signal flashing, etc.

In particular, the search assistant 1 includes a controller 12 for controlling the rotation rv, rh of the movable emitter depending on an element 2 sought in the area 3.

In particular, the search assistant 1 includes a detector 13 for detecting an element 2 sought in the area 3. The detector 13 for detecting a sought element is capable of commanding a rotation of the movable emitter depending on the detected sought element 2.

In particular, the search assistant 1 includes one or more sensors 14 capable of monitoring the area 3 and/or specifically searching for the object 2 in the area 3. The sensor 14 is at least one of the devices from among the following: camera, microphone, WAN receiver, such as a BLUETOOTH™ receiver, a Wi-Fi™ receiver, etc. In particular, the sensor 14 is implemented in the detector 13 (not illustrated).

In particular, when the object 2 is a communication device, the sensor is capable of receiving a response signal posO_answ from the object 2 after the object 2 has received a position request posO_req transmitted by the search assistant 1.

The detector 13 optionally implements an analyzer (not illustrated) that implements image and/or sound recognition functions on video signals from one or more camera-type sensors 14 and/or audio signals from one or more microphone-type sensors 14, respectively.

In particular, the detector 13 provides, in addition to the detected position posO, an additional item of information such as the precision of the detected position, the likelihood of the detection, the visibility of the sought element (visible or concealed by one or more other elements, etc.), etc. Thus, for example, one of the parameters of the visible signal may indicate that the provided position of the sought element 2 has a precision of a few centimeters. In particular, the visible signal may point at the detected position and then rapidly sweep over a segment equal to the margin of precision around this position, or the visible signal may be composed of a first beam with a first luminous power that marks a first circle around the sought element 2, the radius of the circle being dependent on the margin of precision, and of a second, narrower beam with a second luminous power (which is more intense, for example), which points at the detected position of the sought element 2, etc.

In particular, the visible signal sv is a virtual visible signal displayed by an augmented reality headset (not illustrated), and the sought element is a real element 2 of a real area 3.

In this case, the visible signal sv is shown on the screen of the augmented reality headset. The visible signal sv displayed by the augmented reality headset 1 points, for the user U wearing the headset, at a sought element 2 of the real area 3 that is visible to the user U through the screen of the headset 1.

Figure 2A:
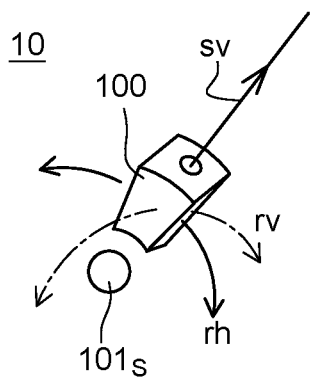
FIG. 2a shows a simplified diagram of a first embodiment of a movable emitter for emitting a visible signal.

FIG. 2*a* illustrates a simplified diagram of a first embodiment of a movable emitter for emitting a visible signal.

In this case, the emitter 10 is a rotatable emitter. It is composed of a visible signal source 100 such as a light source, in particular a laser source. The source 100 is able to move about a rotation sphere 101S. For example, the rotational mobility about the sphere is produced by means of a ball bearing (not illustrated) placed between the rotation sphere 101S and the source 100.

The advantage of a rotatable emitter of this type is to allow rotation of the visible signal sv emitted by the source 100 about the center of the sphere in any direction, in particular horizontal rotation rh and/or vertical rotation rv.

Figure 2B:
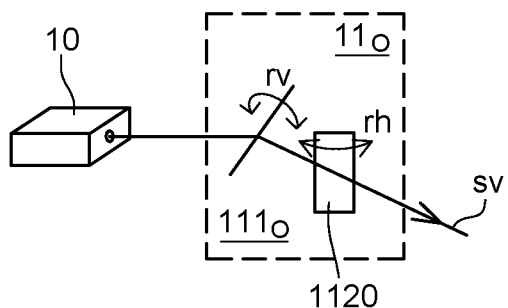
FIG. 2b shows a simplified diagram of a second embodiment of a movable emitter for emitting a visible signal.

FIG. 2*b* illustrates a simplified diagram of a second embodiment of a movable emitter for emitting a visible signal.

In this case, the emitter 10 is stationary, and a direction changer 11O is placed in the path of a visible signal sv emitted by the emitter 10. In particular, the direction changer is an optical device, for example composed of one or more optical lenses 111O, 112O. In particular, a first lens 111O allows the direction of the visible signal to be changed on a vertical axis rv, and a second lens 112O allows the direction of the visible signal to be changed on a horizontal axis rh. Thus, by controlling the two lenses 111O, 112O, the direction of the visible signal sv may be diverted vertically and/or horizontally.

The direction changer may also include one or more mirrors (not illustrated) in order for the direction of the visible signal to be able to be diverted toward the part of the area in and/or in front of which the source 10 is located.

Thus, whatever the embodiment of the direction changer 10, 11O, 11S, whether or not it is incorporated in a movable visible signal emitter, the search assistant 1 placed in an area 3 allows a sought element 2 to be pointed at, whatever the position thereof in the area 3, in front of or behind the source 0, 10 of the visible signal, from the floor to the ceiling.

Figure 3:
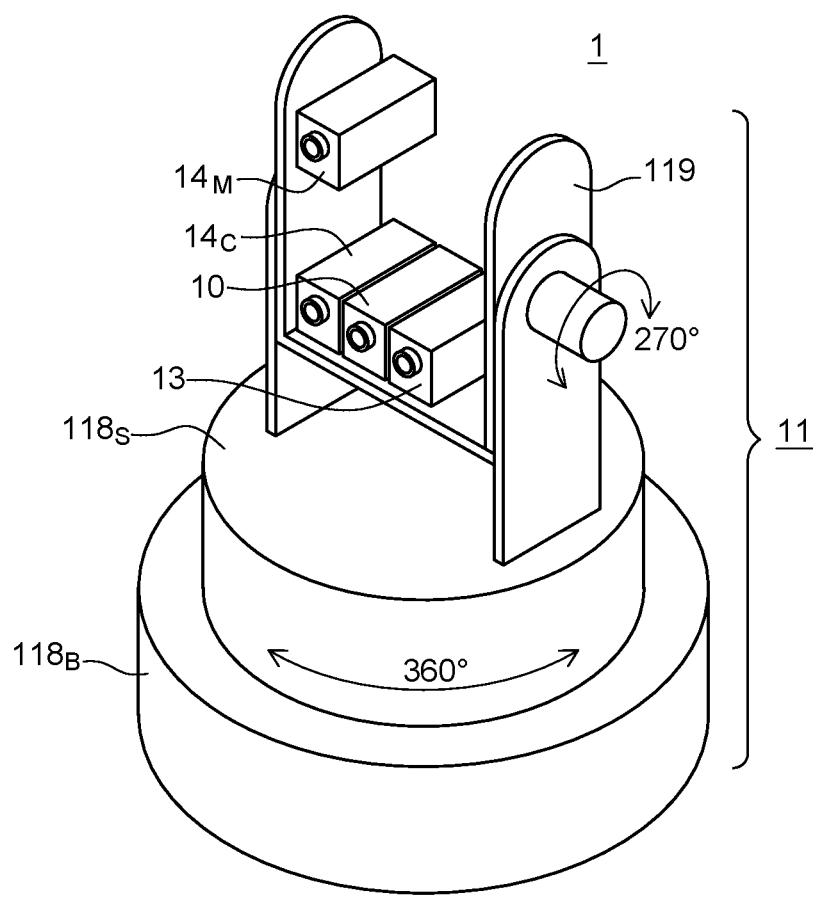
FIG. 3 shows a simplified diagram of an embodiment of a search assistant.

FIG. 3 illustrates a simplified diagram of an embodiment of a search assistant.

The search assistant 1, which is also known in French as a "GéoTrouveTout" pointer is composed of a direction changer 11. In particular, the direction changer 11 includes a base 118B, which is capable of being placed on a horizontal surface such as the floor, a table, a piece of furniture, etc. and a turntable 118S, which turns about a vertical axis, allowing 360° horizontal rotation. The turntable 118S is optionally coupled to a cradle 119, which is able to move about a horizontal axis, allowing 270° vertical rotation.

The turntable 118S or, if applicable, the movable cradle 119 is capable of accommodating at least one emitter such as a laser pointer 10. In particular, the search assistant 1 includes the emitter 10. Thus, the combination of the base 118B, the turntable 118S, the emitter 10 and, if applicable, the movable cradle 119 constitutes a movable visible signal emitter.

In particular, the search assistant 1 is composed of the direction mobilizer 11, such as a robotic articulated arm, a controller 12, such as an inertial positioning unit, detectors 13 and/or sensors 14, 14M, 14C, which may be of various types depending on the intended purpose (microphones 14M, cameras 14C, sensors, rangefinders 13, etc.) and a visible signal sv emitter such as a laser pointer 10.

The search assistant 1 may determine the position to be pointed at by the visible signal in order to point at the sought element 2 by means of various data.

In particular, the data used to determine the position to be pointed at by the visible signal are coordinates of the sought element 2 (in particular, the coordinates are known by the sought element 2 and/or by a monitoring device 4 (such as illustrated in FIG. 4*b*) for monitoring the area 3, and are provided to the search assistant 1). In this case, the search assistant 1 additionally uses position data of the source 10 and/or the direction changer 11 to determine, prior to the position to be pointed at by the visible signal, the position of the sought element 2 in relation to the source 10 and/or to the direction changer 11.

Additionally or alternatively, the data used to determine the position to be pointed at by the visible signal are, for example, an audio signal transmitted by the sought element (a noise made by an object). In this case, the search assistant includes an audio signal analyzer (not illustrated), which is capable of identifying an element by sound recognition. This analyzer works in a noisy environment by virtue of an audio source separator and audio source locators. Thus, the analyzer provides data relating to the sought element 2 on the basis of audio signals transmitted by the sought element after the request to search for this element 2. The data provided by the analyzer after the processing of the audio signals are optionally recorded in a database for the area 3, thus allowing the search assistant to additionally use the information associated with audio signals transmitted by the sought element 2 prior to the request to search for this element 2.

Additionally or alternatively, the data used to determine the position to be pointed at by the visible signal are, in particular, a video signal picked up for the area 3, for example by using one or more cameras 14C (infrared camera, ultraviolet camera and/or visible-light camera, etc.) and/or one or more detectors for detecting any other scattered radiation (invisible or visible diffracted wavelength ranges, etc.). In this case, the search assistant includes an analyzer (not illustrated) for analyzing a video signal, which is capable of identifying a sought element by recognition, in particular visual recognition or image recognition, of the sought element in the video signals. Thus, the analyzer provides data relating to the sought element 2 on the basis of video signals picked up after the request to search for the sought element 2. The data provided by the analyzer after the processing of the video signals are optionally recorded in a database for the area 3, thus allowing the search assistant to additionally use the information associated with video signals picked up prior to the request to search for the sought element 2.

In particular, the operation of the search assistant 1 and, in particular, the control of the direction changer 11 are made possible by virtue of an analyzer for analyzing a mass of recorded and/or captured context information. In particular, the analyzer uses artificial intelligence to find the sought element 2 in this information and transmit the found position of the sought element 2 to a controller 12 for controlling the direction changer 11.

The search assistant 1 makes it possible to reveal to the eyes of a user U a sought element 2, such as a position for drilling, an invisible or unlocated transmission source or an object concealed by at least one other element, by pointing at it with the visible signal sv.

The search assistant optionally includes a rangefinder 13, which is capable of detecting the position of the sought element 2 in order to control the motorized turntable 118S and/or the movable cradle 119. Thus, the search assistant 1 makes it possible to automatically point at the sought element 2 detected by the rangefinder 13.

Furthermore, the search assistant includes, in particular, one or more sensors, such as one or more microphones 14M and/or cameras 14C. The sensors 14M, 14C are capable of providing the detector 13 with data allowing the sought element 2 to be positioned, for example by sound and/or image recognition.

Thus, the search assistant 1 makes it possible to point at the location of the sought element 2 by means of a sight 10, for example of laser type, which is automatically directed by means of a direction changer, for example a manipulable robotic arm 118B, 118S, 119. The search assistant 1 thus indicates, by means of the visible signal sv, a direction and a location where the sought element 2 is located. Thus, the sought element 2 can then be remotely located by a user U.

FIG. 4*a* illustrates a simplified diagram of a first embodiment of a system implementing a search assistant.

The system 4 is in particular a voice assistant capable of providing a response to a voice command, such as the smart speakers GOOGLE HOME™, DGINGO SPEAKER™, AMAZON ECHO™, APPLE HOMEPOD™, etc.

The voice assistant 4 additionally includes a direction changer (not illustrated) for changing the direction of emission of a visible signal sv on the basis of detected relative data of an element 2 sought in an area 3 by means of at least one sensor from among an audio sensor and a video sensor.

In particular, the voice assistant 4 includes at least one microphone 45, which is capable of picking up the voice commands given by a user U, and at least one loudspeaker 46O, which is capable of reproducing, by means of a voice signal, a response to the voice command picked up by the microphone 45. The response is either an acknowledgement of the voice command picked up by the microphone 45 or a response to a question contained in the voice command and processed by a processor implemented either in the voice assistant or in a remote communication equipment, in particular in a communication network (for example in the cloud).

In the latter case, the voice assistant 4 includes a transmitter, which is capable of transmitting the question to the communication equipment, and a receiver, which is capable of receiving the response from the communication equipment.

If the voice command is intended to control a third-party electronic device, the voice assistant includes at least one transmitter, which is capable of transmitting the command either to a controller for controlling the third-party electronic device or directly to the third-party electronic device. The third-party electronic device is located either in the area 3, or in the same home communication network as the voice assistant 4, or it is located remotely and is connected to the voice assistant via an Internet or mobile remote communication network.

In particular, the voice assistant 4 includes a search assistant 41, which implements the direction changer for changing the direction of the visible signal sv. The search assistant 41 in particular receives a search request via a voice command picked up by the microphone 45 of the voice assistant 4. This request triggers the search assistant 41, which controls a detector for detecting the sought element, in particular by using the microphone 45 of the voice assistant when the detector includes a sound analyzer. The sought element is then identified in the area 3 by the sound that it produces or that it has produced after the request. Depending on the results provided by the detector, the movable emitter 41 is moved in a determined direction. The visible signal sv, which is then emitted by the movable emitter 41, points at the sought element 2.

In the example illustrated by FIG. 4a, the direction changer allows the visible signal to be rotated by 360° horizontally and allows the visible signal to be rotated by only 180° vertically on the outside of the voice assistant, which is composed of a cylinder in the figure. There remains a blind spot for visibility in this example above the cylinder. By modifying the search assistant such that the emitter emerges from the cylinder that constitutes the voice assistant, this blind spot can be reduced, since the vertical rotation will have an angle greater than 180°.

FIG. 4b illustrates a simplified diagram of a second embodiment of a system implementing a search assistant.

The system 4 is in particular a monitoring system for monitoring an area, which is capable of detecting at least one element in the area 3. The monitoring system 4 additionally includes a direction changer (not illustrated) for changing the direction of emission of a visible signal sv on the basis of detected relative data of an element 2 sought in an area 3 by means of at least one sensor from among an audio sensor and a video sensor.

In particular, the area monitoring system 4 includes a plurality of sensors: microphones 45M, cameras 45C, etc. capable of providing signals to an analyzer (not illustrated) in order to use recognition to determine events taking place in the area 3, in particular a door being opened/closed, a key being placed on the hallway console, the dishwasher being started, etc. The area monitoring system uses the determined events to control one or more local or remote devices (in particular starting/stopping, closure, notification of communication terminals, etc.) and optionally to inform a user, either by speech synthesis by means of loudspeakers 46R, 46L and/or by means of a display 47, such as a display matrix, one or more LEDs, a screen, etc.

In particular, the area monitoring system 4 includes a search assistant 41, which implements the direction changer for changing the direction of the visible signal sv. The search assistant 41 in particular receives a search request via a voice command picked up by the microphone 45 of the area monitoring system 4. This request triggers the search assistant 41, which controls a detector for detecting the sought element, which detector is for example implemented in the area monitoring system 4, in particular by using the microphone 45 and/or the camera 45C of the area monitoring system when the detector includes a sound analyzer, or controls the sound analyzer of the area monitoring system 4. The sought element is then identified in the area 3 by the sound that it produces or that it has produced after the request and/or an image captured in the area 3 prior to or after the request. Depending on the results provided by the detector/analyzer, the movable emitter 41 is moved in a determined direction. The visible signal sv, which is then emitted by the movable emitter 41, points at the sought element 2.

In the example illustrated by FIG. 4b, the direction changer allows the visible signal to be rotated by 360° horizontally and allows the visible signal to be rotated by practically 360° vertically since the movable emitter is placed eccentrically on top of the area monitoring system 4.

FIG. 4c illustrates a simplified diagram of a third embodiment of a system implementing a search assistant.

The source 40 of the visible signal is composed of a light source of a smartphone-type communication terminal 4. The search assistant 1 is placed in front of this source 40.

The search assistant 1 includes a direction changer (not illustrated) for changing the direction of emission of the visible signal sv provided by the source 40 in front of which it is placed on the basis of detected relative data of an element 2 sought in an area 3 by means of at least one sensor from among an audio sensor and a video sensor.

In particular, the search assistant 1 and the communication terminal 4 are connected in a wired (USB, etc.) or wireless (Bluetooth, NFC, etc.) manner. Thus, the user U performs a search request to search for an element 2 in the area 3 on the communication terminal, either by input on a keypad or touchscreen 47, or by voice command and/or by using a previously captured image of the sought element, which is stored in an image gallery of the communication terminal 4.

The communication terminal optionally implements a detector 13 and/or an analyzer (not illustrated) for analyzing data captured by various sensors, such as microphones 45M, cameras 45C, etc. In particular, the communication terminal includes a transmitter and a receiver capable of communicating with the sought element 2, which will provide its position to the terminal 4. The communication terminal 4 then provides the search assistant 1 with information relating to the position of the sought element 2, determined by the detector/analyzer.

If necessary, the search assistant 1 then controls the direction changer (for example one or more lenses) on the basis of the determined position of the sought element 2 and thus diverts the visible signal sv emitted by the source 40. The diverted visible signal then points at the sought element 2.

The advantage of this search assistant 1 is that it is a simple connected object since it reuses devices that are already implemented by our communication terminals, smartphones, tablets, etc.

The detector and/or the analyzer will optionally be implemented by a processor of the communication terminal that executes a detection and/or analysis method loaded beforehand into the communication terminal in the form of software.

Figure 5:
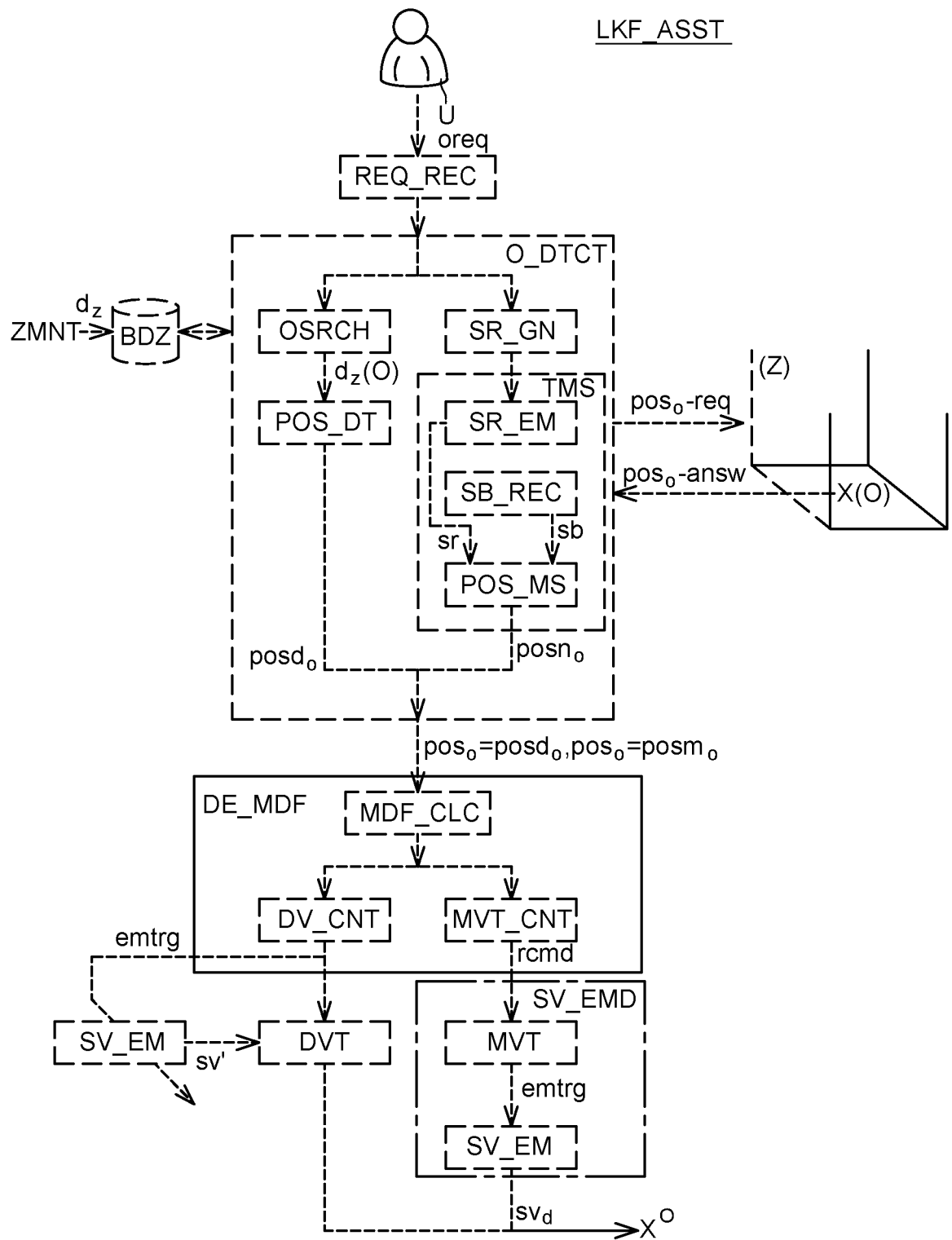
FIG. 5 shows a simplified block diagram of a search assistance method

FIG. 5 illustrates a simplified block diagram of a search assistance method.

A search assistance method LKF_ASST for searching for an element 2 in an area 3 includes a change DE_MDF of the direction of emission of a visible signal sv on the basis of detected relative data of an element O sought in an area Z by means of at least one sensor from among an audio sensor and a video sensor.

In particular, the search assistance method LKF_ASST further includes a detection O_DTCT of the sought element, which provides at least one parameter relating to a position posO of the sought element.

In particular, the search assistance method LKF_ASST includes a detection O_DTCT of the sought element. The detection is of a mode determined on the basis of the type of sought element O and providing at least one parameter relating to a position posO of the sought element.

In particular, the search assistance method LKF_ASST includes a detection O_DTCT of the sought element, which commands the change DE_MDF of direction of the emitted visible signal.

In one particular embodiment, the search assistance method is implemented by using a program comprising program code instructions for executing the steps of the search assistance method for searching for an element when said program is executed by a processor.

In particular, a user U is searching for an element O, for example an object, in a predetermined area. The user U makes their search request oreq to search for the object to the search assistance method LK_ASST either by input on a keypad, a touchscreen, etc. or by voice command, etc.

In particular, the search assistance method LK_ASST includes a reception REQ_REC of a request, in particular making it possible to receive a search request oreq to search for an element, which has been made by a user U or an electronic device (not illustrated) distinct from the search assistant implementing the search assistance method LK_ASST.

In particular, the detection O_DTCT includes a search OSRCH for an object in a monitoring database BDZ for the area. In particular, an area monitoring method ZMNT monitors at least one element of the area. The elements monitored by the area monitoring method ZMNT are at least one element from among the following: an electronic device, a communication device, an object, etc. The area monitoring method ZMNT records data relating to the monitored elements: position of the element, state of the element, etc. in the monitoring database BDZ for the area. In particular, the object search OSRCH directly requests data relating to the sought element from a method ZMNT for monitoring the area. The object search OSRCH then either provides data dZ(O) relating to the object sought in the area, or directly provides data relating to the position posdO of the object sought in the area. If the object search OSRCH does not provide any data relating to the sought position, the search assistance method LK_ASST in particular includes a position determination POS_DT, which determines, on the basis of the data relating to the sought object obtained directly or indirectly from a method ZMNT for monitoring the area, data posdO relating to the sought position.

In particular, the detection O_DTCT includes a reception SB_REC of a signal sb, posO_answ from the sought object O. The received signal sb, posO_answ is optionally one of the following signals: either a reflection by the sought object of at least a portion of a search signal sr that was transmitted beforehand, or a response posO_answ from the electronic device that constitutes the sought object O after the object has received a position request posO_req.

In particular, the detection O_DTCT includes a transmission SR_EM of a signal sr, posO_req into the area Z. The transmitted signal sr, posO_req is optionally one of the following signals: either a signal sr capable of being reflected by the sought object, or a position request posO_req to the electronic device that constitutes the sought object O. Then, the detection O_DTCT includes reception SB_REC of a signal sb, posO_answ from the sought object O. The received signal sb, posO_answ is optionally one of the following signals: either a reflection by the sought object of at least a portion of a search signal sr that was transmitted beforehand, or a response posO_answ from the electronic device that constitutes the sought object O after the object has received a position request posO_req.

In particular, the detection O_DTCT includes a generation SR_GN of a search signal prior to the transmission of the search signal SR_EM.

In particular, the detection O_DTCT includes a position measurement POS_MS on the basis of the received signal sb and optionally of the transmitted search signal sr. The position measurement POS_MS then provides the measured position of the object posmO.

Thus, the change DE_MDF of the direction of emission of the visible signal is dependent in particular on the determined position posdO after the object search OSRCH or on the measured position posmO.

In particular, the change DE_MDF of the direction of emission of the visible signal includes a change calculation MDF_CLC, which provides, on the basis of data relating to the position of the sought object O, either a changed direction or a direction offset to be applied in order to change the direction of the visible signal.

In particular, the change DE_MDF of the direction of emission of the visible signal includes either a diversion control DV_CNT or a movement control MVT_CNT, controlling an optical diversion DVT of the emitted visible signal sv or a mobility of a movable emission SV_EMO of a visible signal, respectively. In particular, the search assistance LKF_ASST respectively includes the diversion DVT or a movable emission SV_EMO of a visible signal.

In the case of a change DE_MDF of the direction of emission of the visible signal that includes a diversion control DV_CNT, the control DV_CNT triggers emtrg an emission SV_EM of the visible signal sv', which is implemented in particular by the search assistance LKF_ASST. The diversion DVT changes the direction of the emitted visible signal sv' and provides a diverted visible signal sv that points at the sought object.

In the case of a change DE_MDF of the direction of emission of the visible signal that includes a movable emission mobility control MVT_CNT, the control MVT_CNT in particular commands rcmd a movement MVT, for example a rotation, either of a support of a stationary visible signal emitter or directly of a movable visible signal emitter. The movement MVT optionally triggers emtrg the emission SV_EM of a visible signal. In particular, the movable emission SV_EMO includes the movement MVT and the emission SV_EM of a visible signal. Thus, the emitted visible signal sv points at the sought object O.

The disclosed technology also relates to a medium. The information medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program may in particular be downloaded from a network, in particular from the Internet.

As an alternative, the information medium may be an integrated circuit in which the program is incorporated, the circuit being designed to execute or to be used in the execution of the method in question.

In another implementation, embodiments of the disclosed technology are implemented by way of software and/or hardware components. With this in mind, the term module may correspond equally to a software component or to a hardware component. A software component corresponds to one or more computer programs, one or more subroutines of a program or, more generally, to any element of a program or of software that is capable of implementing a function or a set of functions in accordance with the above description. A hardware component corresponds to any element of a hardware assembly that is capable of implementing a function or a set of functions.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. In some examples, certain structures and techniques may be shown in greater detail than other structures or techniques to further explain the examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A search assistant for searching for an element in an area, the search assistant comprising:
    a direction changer configured to change the direction of emission of a visible signal on the basis of detected relative data of an element sought in the area by at least one sensor, the sensor comprising at least one of:
       an audio sensor, and
       a video sensor.

2. The assistant of claim 1, wherein the direction changer comprises one or more of the following devices:
    a rotatable support capable of accommodating a stationary emitter for emitting the visible signal, the movable support being capable of changing the position of the stationary emitter, and
    an optical device capable of changing the direction of the visible signal depending on the element sought in the area.

3. The assistant of claim 1, wherein the direction changer is configured to allow rotational mobility of the direction of emission of the visible signal, the rotational mobility being one of the following rotational mobilities:
    rotational mobility relative to one or more given axes; and
    rotational mobility relative to a point.

4. The assistant of claim 1, wherein at least one parameter of the emitted visible signal is dependent on at least one parameter relating to the sought element.

5. The assistant of claim 1, wherein the search assistant further comprises a controller configured to control the rotation of a movable emitter depending on an element sought in the area.

6. The assistant of claim 1, wherein the search assistant further comprises a detector configured to detect an element sought in the area, the detector being capable of commanding a rotation of a movable emitter depending on the detected sought element.

7. The assistant of claim 1, wherein the search assistant includes an emitter configured to emit the visible signal, wherein the emitter comprises at least one of:
    rotatable emitter configured to emit the visible signal, the rotatable emitter implementing the direction changer, and
    a stationary emitter for emitting the visible signal, the stationary emitter separate from the direction changer.

8. The assistant of claim 1, wherein the visible signal comprises a virtual visible signal displayed by an augmented reality headset, and the sought element comprises a real element of a real area.

9. The assistant of claim 1, wherein the search assistant comprises a voice assistant capable of providing a response to a voice command, the voice assistant comprising the direction changer.

10. A monitoring system configured to monitoring an area, the monitoring system capable of detecting at least one element in the area, the monitoring system further comprising:
    a direction changer configured to change the direction of emission of a visible signal on the basis of detected relative data of an element sought in the area by at least one sensor, the sensor comprising at least one of:
       an audio sensor, and
       a video sensor.

11. A search assistance method for searching for an element in an area with a visible signal, the search assistance method including:
    changing the direction of emission of a visible signal on the basis of detected relative data of an element sought in an area by at least one sensor, the sensor comprising at least one of:
       an audio sensor, and
       a video sensor.

12. The method of claim 11, the method further comprising detecting the sought element, the detection being of a mode determined on the basis of the type of sought element and providing at least one parameter relating to a position of the sought element.

13. The method of claim 11, the method further comprising detecting the sought element, the detecting of the sought element commanding the change of direction of the emitted visible signal.

14. A non-transitory computer readable storage medium having stored thereon instructions which cause a processor to implement the method of claim 11 when the instructions are executed by the processor.

15. The method of claim 11, wherein the search assistance method further includes a detection of the sought element, which provides at least one parameter relating to a position of the sought element.

16. The assistant of claim 1, wherein the at least one sensor comprises an audio sensor, the detected relative data of the element sought in the area by the audio sensor comprising audio data used to identify a relative position of the element sought in the area.

17. The assistant of claim 1, wherein the detected audio data comprises an audio signal transmitted by the sought element after a request to search for the sought element.

18. The assistant of claim 1, wherein the at least one sensor comprises a video sensor, the detected relative data of the element sought in the area by the video sensor comprising video data used to identify a relative position of the element sought in the area.

* * * * *